United States Patent
Utz et al.

(10) Patent No.: US 12,066,845 B2
(45) Date of Patent: Aug. 20, 2024

(54) DEVICE HEATER MODULE

(71) Applicant: Dell Products, L.P., Round Rock, TX (US)

(72) Inventors: James Utz, Austin, TX (US); Jeffrey R. Taus, Austin, TX (US); Zachary A. Cravens, Round Rock, TX (US)

(73) Assignee: DELL PRODUCTS, L.P., Round Rock, TX (US)

(*) Notice: Subject to any disclaimer, the term of this patent is extended or adjusted under 35 U.S.C. 154(b) by 140 days.

(21) Appl. No.: 17/483,225

(22) Filed: Sep. 23, 2021

(65) Prior Publication Data
US 2023/0086310 A1    Mar. 23, 2023

(51) Int. Cl.
  *G05D 23/19*  (2006.01)
  *G06F 1/18*   (2006.01)
  *G06F 1/26*   (2006.01)

(52) U.S. Cl.
  CPC ......... *G05D 23/1928* (2013.01); *G06F 1/181* (2013.01); *G06F 1/187* (2013.01); *G06F 1/263* (2013.01)

(58) Field of Classification Search
  CPC ..... G05D 23/1928; G06F 1/181; G06F 1/187; G06F 1/263
  See application file for complete search history.

(56) References Cited

U.S. PATENT DOCUMENTS

| | | | | |
|---|---|---|---|---|
| 2006/0016793 | A1* | 1/2006 | Zhu | H01M 10/63 219/205 |
| 2008/0294295 | A1* | 11/2008 | Chiu | G06F 1/206 700/299 |
| 2009/0198387 | A1* | 8/2009 | Lin | G06F 1/26 713/2 |
| 2010/0070745 | A1* | 3/2010 | Chiu | G06F 1/206 713/2 |
| 2013/0138935 | A1* | 5/2013 | Belady | G06F 9/44 713/1 |
| 2013/0151833 | A1* | 6/2013 | Chiu | G06F 11/3024 713/2 |
| 2015/0121925 | A1* | 5/2015 | Park | F25D 17/065 62/186 |
| 2020/0286804 | A1* | 9/2020 | Fallin | H01L 23/345 |
| 2021/0103305 | A1* | 4/2021 | Nikazm | G05D 23/1928 |
| 2021/0208645 | A1 | 7/2021 | Kelly et al. | |

FOREIGN PATENT DOCUMENTS

TW    I244884 B  * 12/2005

* cited by examiner

*Primary Examiner* — Santosh R Poudel
(74) *Attorney, Agent, or Firm* — Amin, Turocy & Watson, LLP

(57) ABSTRACT

A device heater module can be installed within a device such as a server, and can prevent the device from powering on while the temperature of the device is being restored to an operating temperature. The device heater module can prevent the device from powering on by operating a switch to disconnect the device from an external power supply. The device heater module can thereafter actively or passively modify the temperature of the device. After the temperature of the device is restored to within the operating temperature, the device heater module can operate the switch to reconnect the device to the external power supply, thereby allowing the device to initiate a boot process.

20 Claims, 10 Drawing Sheets

DEVICE HEATER MODULE

BACKGROUND

Some computing devices are deployed in remote enclosures without reliable environmental control. For example, cellular telecommunications equipment, such as antennas and related computing equipment, can be situated in remote rural and wilderness areas which may experience temperature extremes. The enclosures in which such equipment is housed may not have heating or cooling systems, and so the equipment may also be subject to temperature extremes.

In the case of cellular telecommunications equipment, fifth generation (5G) and subsequent generation cellular telecommunications systems increasingly include edge computing resources in the form of servers situated at or near radio access network antennas. As a result, there may be an increase in the number of servers deployed in remote areas.

A number of approaches have been proposed for the purpose of heating computing devices. However, prior approaches are not straightforward to employ for the purpose of heating computers in remote environments, for several reasons. Some designs require an independent external power supply, thereby requiring additional cables and wiring. Other designs require that the computing device to be heated is alive in order to manage the heater. For the computing device to be alive, its circuitry and power subsystem must be able to operate in extreme temperature conditions, which is not always possible.

The above-described background is merely intended to provide a contextual overview of some current issues regarding conventional approaches to heating computing devices, and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1A:
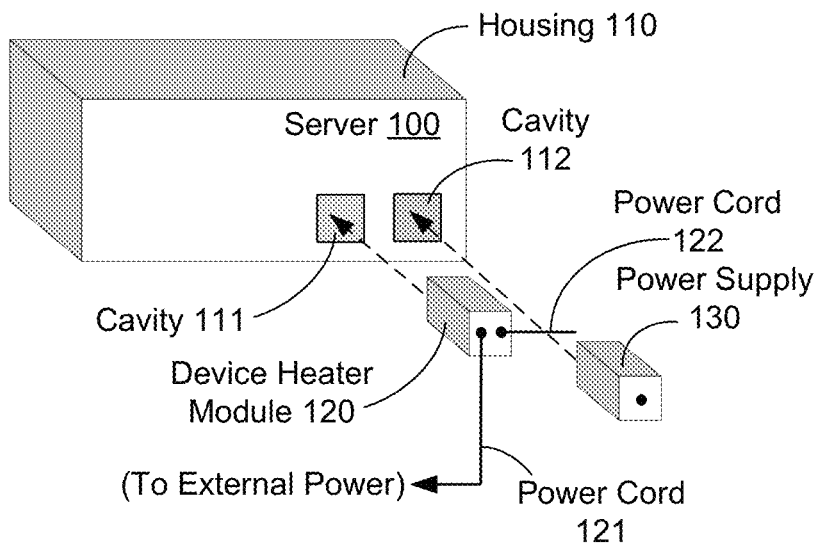
FIG. 1A illustrates an example server device comprising a cavity and a device heater module that can be slidably engaged therein, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed to a device heater module, devices adapted to employ the device heater module, and corresponding methods and computer readable media. Some example device heater modules can be installed within a device such as a server, and can prevent the device from powering on while the temperature of the device is being restored to an operating temperature. The device heater module can prevent the device from powering on by operating a switch to disconnect the device from an external power supply. The device heater module can thereafter actively or passively modify the temperature of the device. After the temperature of the device is restored to within the operating temperature, the device heater module can operate the switch to reconnect the device to the external power supply, thereby allowing the device to initiate a boot process.

Figure 1B:
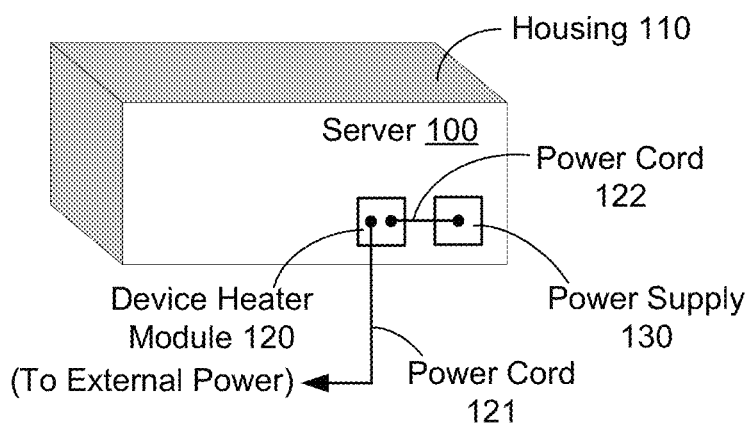
FIG. 1B illustrates the server device and device heater module introduced in FIG. 1A, wherein the device heater module has been engaged into the server device cavity, in accordance with one or more embodiments described herein.

FIG. 1A and FIG. 1B illustrate an example server device and a device heater module that can be slidably engaged therein, in accordance with one or more embodiments described herein. The example server 100 comprises a housing 110 and cavities 111 and 112. The example device heater module 120 is slidably engageable in the cavity 111, and the power supply 130 is slidably engageable in the cavity 112. FIG. 1A illustrates the server 100, device heater module 120, and power supply 130 prior to engaging the device heater module 120 and power supply 130 in the cavities 111, 112, and FIG. 1B illustrates the server 100, device heater module 120, and power supply 130 after engaging the device heater module 120 and power supply 130 in the cavities 111, 112. The device heater module 120 can connect to the power supply 130 via a power cord 122, and the device heater module 120 can connect to external power via a power cord 121. The device heater module 120 can open and close a switch in order to disconnect and reconnect the power supply 130 and the external power.

The server 100 is an example of a device that can be heated by the device heater module 120 disclosed herein. In some embodiments, the server 100 can comprise, e.g., an XR11 type server made by DELL®, or a similar type of computing device. The XR11 server includes multiple power supply unit (PSU) cavities, designed to receive redundant PSUs such as power supply 130. The device heater module 120 can optionally comprise a shape adapted to engage an existing PSU cavity. When the device heater module 120 is employed, a cavity 111 that could otherwise be occupied by a PSU can instead be used for the device heater module 120. In other embodiments, the server 100 can be configured with an additional cavity for the device heater module 120, in which case there would be no need to sacrifice a PSU cavity. The disclosed device heater module 120 can comprise any shape designed to fit inside or otherwise engage with any device cavity, as may be suitable for particular devices and environments.

While the device heater module 120 is characterized herein as a "heater" module and heater type embodiments are considered probable, it should be emphasized that this disclosure is not necessarily limited to embodiments that actively heat the server 100. Some embodiments can be configured for temperature control more generally, including heating and/or cooling of the server 100. The heater structures disclosed herein can be supplemented or replaced by a cooling device, or two modules can optionally be used, one for heating and the other for cooling.

Furthermore, embodiments need not necessarily actively heat or cool the server 100. Instead, some embodiments can control a connection between the server 100 and external power, e.g., using a switch as described herein, in response to temperature measurements. When the temperature measurements are outside the design temperatures of the server 100, embodiments can activate the switch to disconnect the server 100 from the external power. When the temperature measurements return to being within the design temperatures of server 100, embodiments can activate the switch to reconnect the server 100 to the external power. Such embodiments need not necessarily perform the additional operation of actively heating or cooling the server 100.

For cooling embodiments according to this disclosure, terms such as "heater" and "threshold low temperature" can be replaced with "cooling device" and "threshold high temperature." It should also be understood that combination heating and cooling embodiments can be made according to the techniques disclosed herein. For embodiments that do not actively heat or cool the server 100, the heater and/or fan elements of the device heater module 120 disclosed herein can be omitted while the remaining structures of the device heater module 120 can generally operate as disclosed, with adaptations as appropriate.

Figure 2:
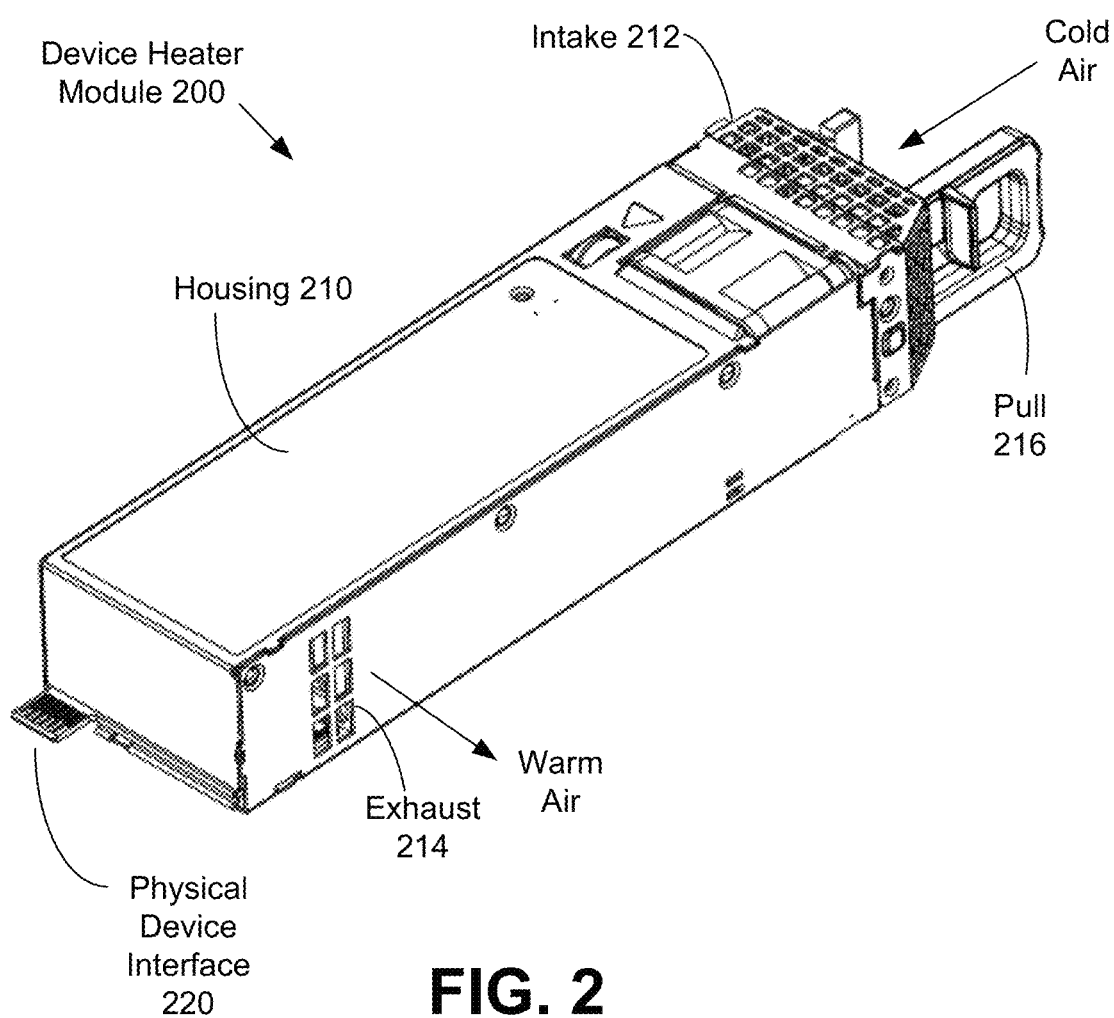
FIG. 2 illustrates an exterior housing of an example device heater module, in accordance with one or more embodiments described herein.

FIG. 2 illustrates an exterior housing of an example device heater module, in accordance with one or more embodiments described herein. The example device heater module 200 can implement the device heater module 120 introduced in FIG. 1. The device heater module 200 comprises an exterior housing 210 that can enclose the internal components described in connection with FIG. 3.

The housing 210 can include an intake 212 at a proximal end of the device heater module 200, and an exhaust 214 at a distal end of the device heater module 200. The intake 212 and the exhaust 214 can both comprise openings in the housing 210, e.g., the grill type openings illustrated in FIG. 2. The intake 212 allows cold air flow into the device heater module 200, while the exhaust 214 allows warm air flow out of the device heater module 200.

FIG. 2 also illustrates an example physical device interface 220 and a pull 216. The pull 216 can facilitate removal of the device heater module 200 from a device such as server 100. The physical device interface 220 can enable communication between a controller in the device heater module 200 and the server 100. For example, the controller can be configured to detect whether the server 100 is on or off via the physical device interface 220. When the server 100 is on, the server 100 can optionally control the device heater module 200 by providing instructions to the controller via the physical device interface 220. The physical device interface 220 can also include a ground loop or other structure that immediately deactivates the device heater module 200 as a safety precaution when the device heater module 200 is removed from the server 100.

Figure 3:
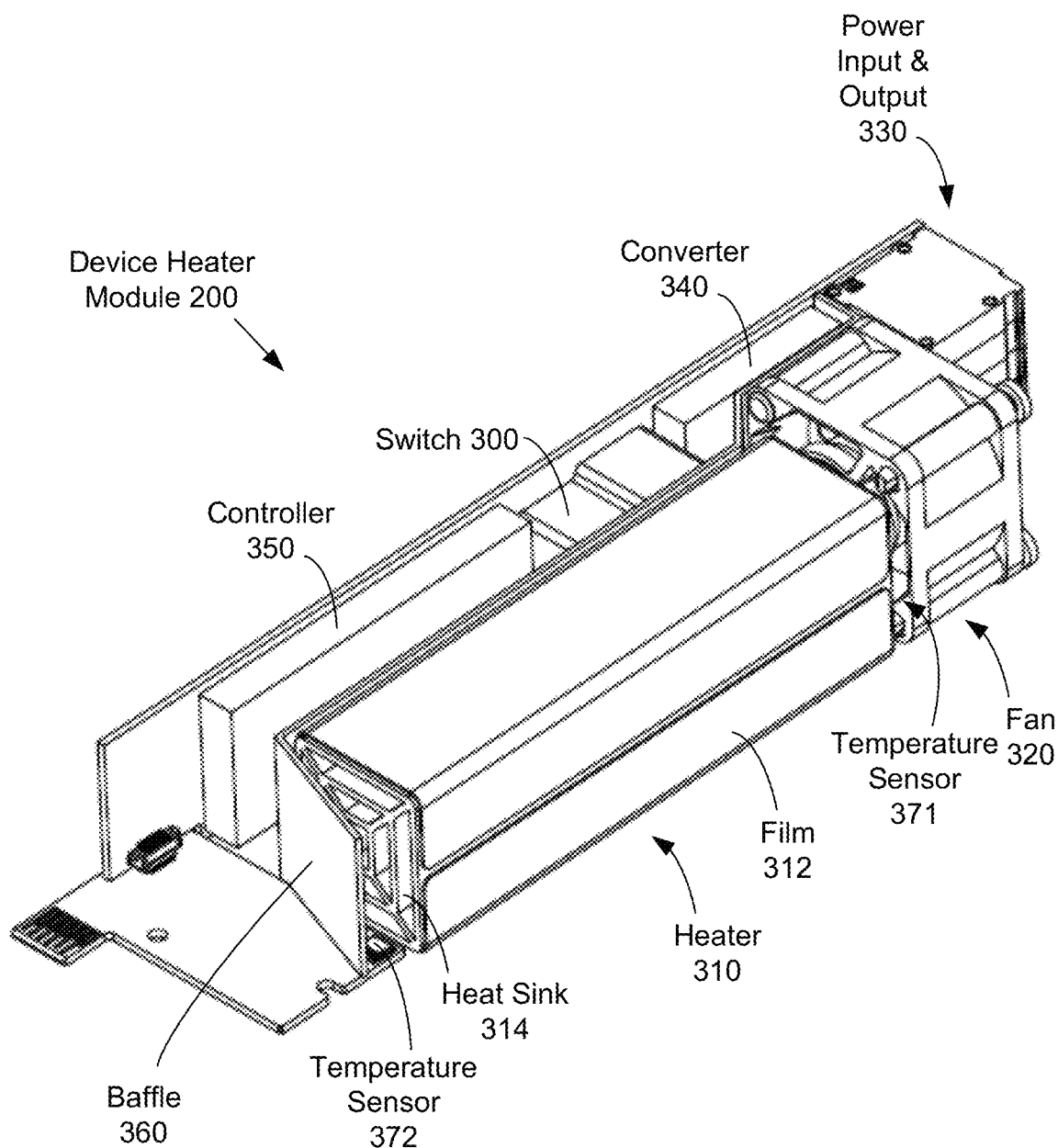
FIG. 3 illustrates internal components of the example device heater module introduced in FIG. 2, in accordance with one or more embodiments described herein.

FIG. 3 illustrates internal components of the example device heater module introduced in FIG. 2, in accordance with one or more embodiments described herein. The example device heater module 200 can include, inter alia, a switch 300, a heater 310, a fan 320, a power input and output 330, a converter 340, a controller 350, a baffle 360, and temperature sensors 371 and 372. The heater 310 can include a film 312 and a heat sink 314.

In an example embodiment, the power input and output 330 can comprise two electrical interfaces: a first interface for connecting the device heater module 200 to an external power supply, and a second interface for connecting the device heater module 200 to a device power input, such as an input to the power supply 130 illustrated in FIG. 1. The converter 340 can convert power received via the first interface, as appropriate for use by the device heater module 200. The switch 300 can connect and disconnect power supplied to the device 100 via the second interface. The switch 300 can be controlled by the controller 350.

The controller 350 can be adapted to detect temperature via the temperature sensors 371 and 372, and to open the switch 300 in order to disconnect the power supplied via the second interface under certain temperature and/or other detected conditions as described herein. The controller 350 can be further adapted to operate the fan 320 and the heater 310 under certain temperature and/or other conditions. The controller 350 can be further adapted to close the switch 300 in order to reconnect the power supplied via the second interface, e.g., after operating the fan 320 and the heater 310 or otherwise in response to a change in the temperature and/or other conditions.

In an example embodiment, the power input and output 330 can include a first interface in the form of a direct current (DC) input interface, e.g., a 48 Volt, 30 Amp DC input interface. The power input and output 330 can further include a second interface in the form of a DC output interface, e.g., a 48 Volt, 30 Amp DC output interface. These interfaces can alternatively take the form of alternating current (AC) interfaces in some embodiments.

The converter 340 can comprise, e.g., a DC-DC converter that converts the 48 Volt, 30 Amp DC input to, e.g., 12 Volt power for use by the fan 320, heater 310, and controller 350. The controller 350 can optionally comprise a further power conversion element to down convert 12 Volt power from the converter 340 into an appropriate power supply for the controller 350.

The temperature sensors 371 and 372 can comprise digital temperature sensors. Some embodiments can include multiple temperature sensors such as illustrated in FIG. 3, while other embodiments can optionally include a single temperature sensor. In embodiments with multiple temperature sensors 371, 372, a first temperature sensor 371 can measure air temperature at an intake/proximal end of the device heater module 200, while a second temperature sensor 372 can measure air temperature at an output/distal end of the device heater module 200. The controller 350 can optionally be adapted to use either or both of the temperature sensors 371, 372 to measure "cold" temperature at the device 100, e.g., prior to operating the heater 310. While operating the heater 310, the controller 350 can optionally adjust the power supplied to the heater 310 and or the speed of the fan 320 based on temperature differences detected from temperature sensors 371, 372.

The switch 300 can comprise, e.g., a relay that can connect and disconnect the 48 Volt, 30 Amp DC input interface and the 48 Volt, 30 Amp DC output interface in the power input and output 330. The switch 300 can be controllable by the controller 350.

Figure 4:
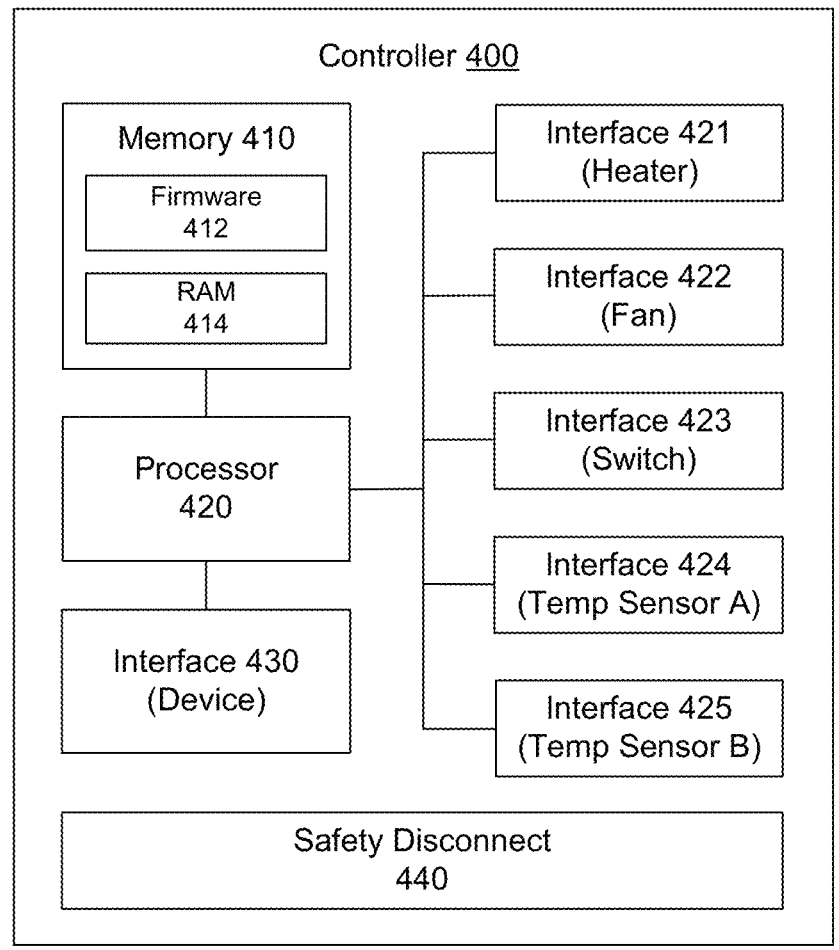
FIG. 4 illustrates physical elements of an example controller for a device heater module, in accordance with one or more embodiments described herein.
Figure 5:
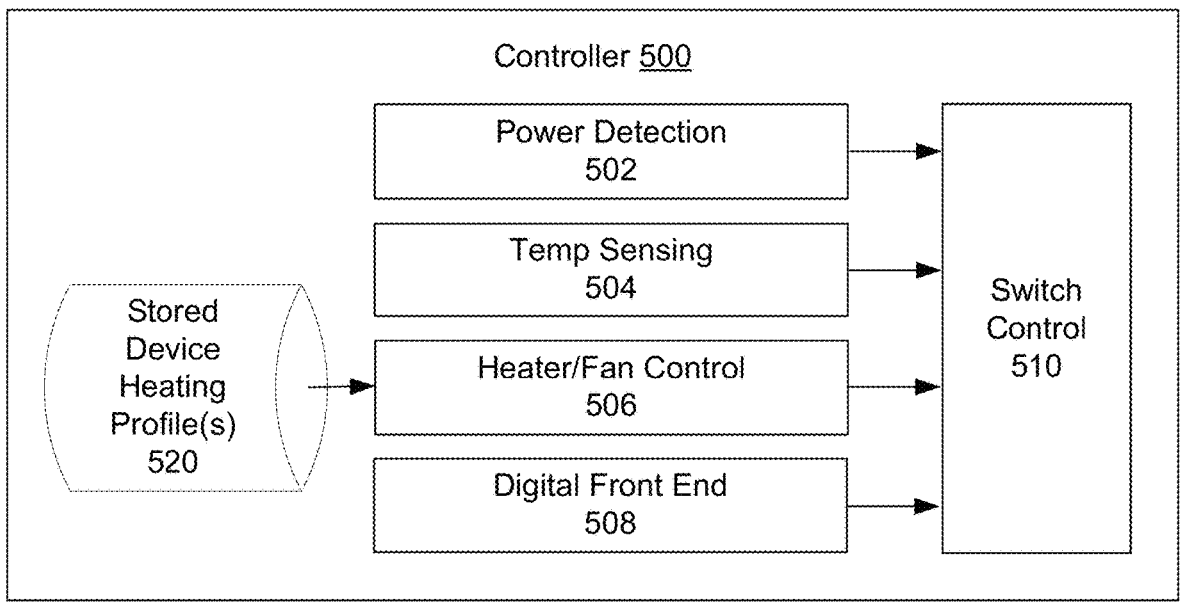
FIG. 5 illustrates logical elements of an example controller for a device heater module, in accordance with one or more embodiments described herein.

The controller 350 can comprise hardware elements and controller logic as described further in connection with FIG. 4 and FIG. 5. In general, the controller 350 can be coupled with the converter 340, the temperature sensors 371 and 372, the switch 300, the heater 310, the fan 320, and the physical device interface 220 introduced in FIG. 2. The controller 350 can monitor device 100 state via the physical device interface 220. The controller 350 can furthermore monitor temperature via the temperature sensors 371 and 372, and the availability of power via the converter 340. The controller 350 can be configured to operate the switch 300, the fan 320, and the heater 310 in response to temperature and other conditions as described herein.

The heater 310 can comprise, e.g., a heatsink 314 wrapped in a thin film 312, wherein the film 312 comprises a resistive heater coupled with a power output from the converter 340. The fan 320 can comprise an axial fan positioned to move air through the heat sink 314. The baffle 360 can comprise a sheet of material disposed at an angle with respect to the heat sink 314, in order to direct air exiting the heat sink 314 in a desired direction to heat the device 100.

FIG. 4 illustrates physical elements of an example controller for a device heater module, in accordance with one or more embodiments described herein. The example controller 400 can implement the controller 350 in some embodiments. The example controller 400 includes a memory 410, a processor 420, an interface 430 to the device 100, multiple additional interfaces 421, 422, 423, 424, and 425 to the heater, fan, switch, and temperature sensors, and a safety disconnect 440. The memory 410 can comprise firmware 412 and random access memory (RAM) 414.

In an example embodiment, the controller 400 can comprise a microcontroller with general purpose input/output (GPIO) interfaces 421, 422, 423, 424, and 425 to control the various elements of the device heater module 200, and a "digital front end" interface 430 to the device, e.g., to the server 100 illustrated in FIG. 1. The interface 430 can be coupled with the physical device interface 220 illustrated in FIG. 2. The safety disconnect 440 can comprise a ground loop in the physical device interface 220 that disconnects the heater 310 and fan 320 from electrical power when the device heater module 200 is disconnected from the device 100.

FIG. 5 illustrates logical elements of an example controller for a device heater module, in accordance with one or more embodiments described herein. The example controller 500 can implement the controller 400 as well as the controller 350 in some embodiments. The example controller 500 includes power detection 502, temp sensing 504, heater/fan control 506, digital front end 508, switch control 510, and stored device heating profiles 520.

In embodiments according to FIG. 5, power detection 502 can detect when power becomes available at the controller 500. For example, power detection 502 can detect when a device heater module 200 is initially plugged in, or when power is restored at device heater module 200 after a power failure. Power detection 502 can operate switch control 510 to open a switch 300, thereby disconnecting the device 100 from power, in response to power detection 502 detecting that power is initially activated at the device heater module 200.

Subsequent to opening the switch 300 by power detection 502, temp sensing 504 can detect a temperature at the device 100. For example, the controller 500 can read a temperature at either or both of temperature sensors 371 and 372. If the temperature is above a threshold low temperature, e.g., within a temperature range specified for the device 100, then temp sensing 504 can operate switch control 510 to close the switch 300, thereby reconnecting the device 100 to power, and allowing the device 100 to boot. If the temperature is below the threshold low temperature, e.g., below the temperature range specified for the device 100, then temp sensing 504 can maintain the switch 300 in the open state, thereby preventing the device 100 from boot.

In another aspect, subsequent to opening the switch by power detection 502, the digital front end 508 can check device 100 state, namely, whether the device 100 is on or off. It is possible that in certain scenarios the device 100 remains on despite being disconnected from external power, for example, when the device 100 continues to run on battery power from a PSU during a power failure or during a period when the device 100 is temporarily unplugged from external power. In response to detecting, by the digital front end 508, that the device 100 state is on, the digital front end 508 can operate switch control 510 to close the switch 300, thereby reconnecting the device 100 to external power, and allowing the device 100 to continue to run on external power. Conversely, in response to detecting, by the digital front end 508, that the device 100 state is off, the digital front end 508 can maintain the switch 300 in the open state, thereby preventing the device 100 from boot.

If neither temp sensing 504 nor digital front end 508 operate switch control 510 to close the switch 300, thereby reconnecting the device 100 to external power, then the controller 500 can activate heater/fan control 506 to warm the device 100. Heater/fan control 506 can operate the heater 310 and/or fan 320 in order to warm the device 100. After heater/fan control 506 has warmed the device 100, heater/fan control 506 can operate switch control 510 to close the switch 300, thereby reconnecting the device 100 to external power and allowing the device 100 to boot.

In some embodiments, heater/fan control 506 can operate according to a stored device heating profile from stored device heating profile(s) 520. The stored device heating profile(s) 520 can specify, e.g., duration of operating the heater 310 and fan 320, fan 320 speed, and/or heater 310 wattage.

In some embodiments, the stored device heating profile(s) 520 can include one stored device heating profile which is pre-loaded in stored device heating profile(s) 520 based on the device 100 type. In other embodiments, the stored device heating profile(s) 520 can include multiple stored device heating profiles, and the controller 500 can be configured to select a stored device heating profile. For example, the controller 500 can be configured to select a stored device heating profile based on a temperature detected at the temperature sensors 371, 372.

In some embodiments, heater/fan control 506 can omit use of the stored device heating profile(s) 520. Instead, the controller 500 can be configured to operate the heater 310 and fan 320 and, during operation of the heater 310 and fan 320, the controller 500 can repetitively check temperature at the temperature sensors 371 and/or 372. When a temperature reading at one or more of the temperature sensors 371 and/or 372 reaches a predefined temperature that suggests the device 100 has returned to its operating temperature, the controller 500 can operate switch control 510 to close the switch 300, thereby reconnecting the device 100 to external power and allowing the device 100 to boot.

Whether using stored device heating profile(s) 520 or checking temperature, the heater/fan control 506 can optionally be configured to operate the heater 310 and fan 320 for longer durations in response to colder temperatures, and vice versa. Furthermore, the heater/fan control 506 can be configured to operate the heater 310 at higher wattages in response to colder temperatures, and vice versa. Furthermore, the heater/fan control 506 can optionally be configured to operate the fan 320 at slower speeds in response to colder temperatures, and vice versa.

The heater/fan control 506 can optionally be configured to operate the heater 310 and fan 320 using a binary approach, in which the heater 310 and fan 320 are repetitively turned on and off, optionally at a frequency and for durations correlated to temperature, such as by using higher frequencies and/or longer durations at colder temperatures, and vice versa. Alternatively, the heater/fan control 506 can optionally be configured to operate the heater 310 and fan 320 in a continuous approach, by continuous use of selected heater powers and fan speeds, which can be adjusted over the course of a heating cycle. The heater/fan control 506 can use pulse width modulation to control the fan speed and heater power.

In some embodiments, heater/fan control 506 can be configured to store heater activation information, also referred to herein as a "syswarm" signal, after heater/fan control 506 has heated the device 100 such that the switch 300 can be closed, thereby reconnecting the device 100 to external power and allowing the device 100 to boot. The syswarm signal can be used by the device 100 in connection with its boot process, as described further in connection with FIG. 6.

In some embodiments, when the device 100 state is on, the controller 500 can be configured to provide temperature readings from temperature sensors 371, 372 to the device 100 via the digital front end 508, in response to temperature requests from the device 100. Furthermore, the controller 500 can be configured to operate the heater 310 and/or fan 320 pursuant to control instructions received via the digital front end 508.

Figure 6:
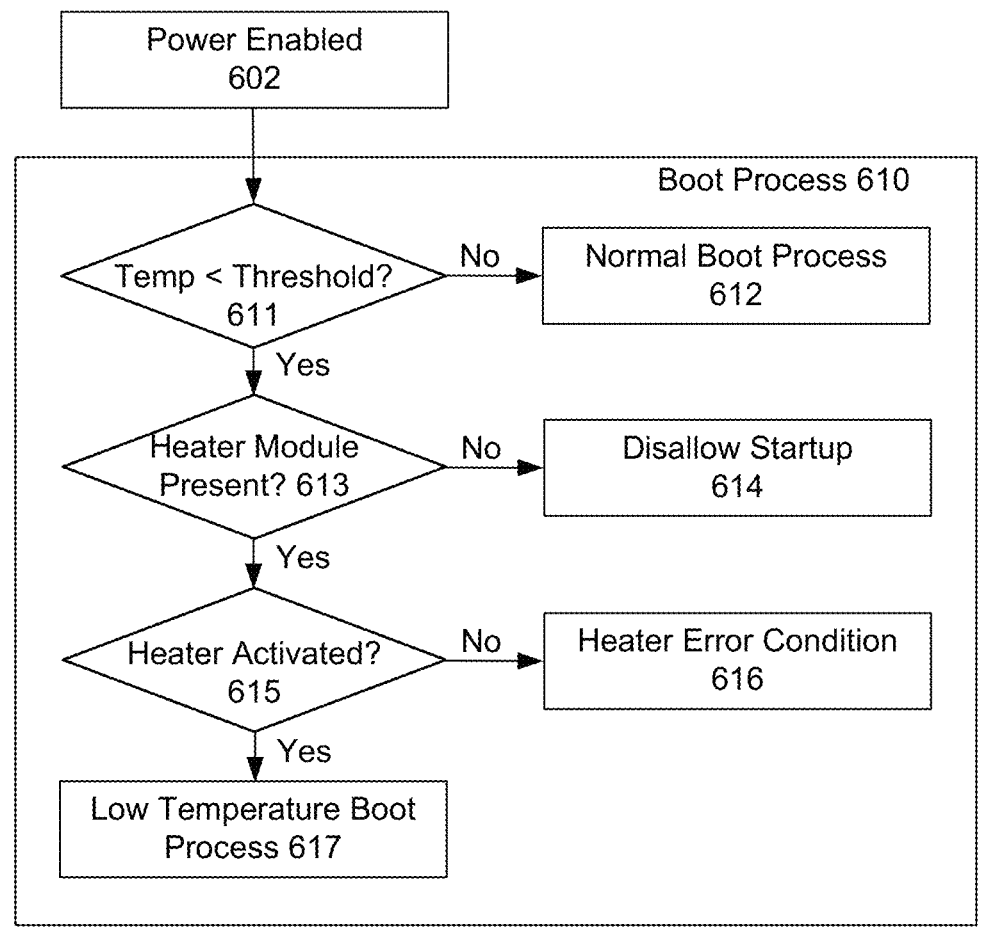
FIG. 6 illustrates an example boot process for a device that includes a device heater module, in accordance with one or more embodiments described herein.

FIG. 6 illustrates an example boot process for a device that includes a device heater module, in accordance with one or more embodiments described herein. The illustrated boot process can be followed by a device such as the server 100 illustrated in FIG. 1. FIG. 6 includes a power enabled block 602 and a boot process 610. The boot process 610 comprises a "temp<threshold" decision 611, followed by a "heater module present" decision 613, followed by a "heater activated" decision 615, followed by a low temperature boot process 617. A "no" at decision 611 leads to normal boot process 612, while a "yes" leads to the subsequent decision 613. A "no" at decision 613 leads to disallow startup 614, while a "yes" leads to the subsequent decision 615. A "no" at decision 615 leads to heater error condition 616, while a "yes" leads to the low temperature boot process 617.

In an example according to FIG. 6, at power enabled 602, power is restored to the device 100, either by operation of a switch 300 by a device heater module 200, or by a return of external power in a situation wherein no device heater module 200 is present. The boot process 610 is initiated in response to the restoration of power.

At 611, the device 100 can check a temperature at or near the device 100, for example, by sending a temperature request to the device heater module 200, or by any other approach. If the temperature is not below a threshold low temperature, then the temperature is within the device 100 operating range, and the device 100 can proceed with normal boot process 612. An example operating range is −5° to 55° Celsius (C), in which case, −5° C. can be the threshold low temperature. If the temperature is below the threshold low temperature, then the temperature is outside the device 100 operating range, and the device 100 can proceed to decision 613.

At 613, the device 100 can check whether a device heater module 200 is present within the device 100. For example, the device 100 can check physical device interface 220 for information indicative of a device heater module 200. If no device heater module 200 is detected, then the device 100 can disallow startup at operation 614, e.g., by terminating the boot process 610. If a device heater module 200 is detected, then the device 100 can proceed to decision 615.

At 615, the device 100 can check whether the device heater module 200 was activated. For example, as described in connection with FIG. 5, the device heater module 200 can store heater activation information, also referred to herein as a "syswarm" signal, after the device heater module 200 heated the device 100. The device 100 can check for a stored syswarm indicator via the physical device interface 220. If the syswarm indicator is present, then the device 100 was warmed by the device heater module 200 and the device 100 can proceed with a low temperature boot process 617. The low temperature boot process 617 can comprise, inter alia, extended fan tables and slow ramp fan controls. If the syswarm indicator is not present, then the device 100 device heater module 200 may have malfunctioned and the device 100 can log a heater error condition 616, optionally followed by terminating the boot process 610.

Figure 7:
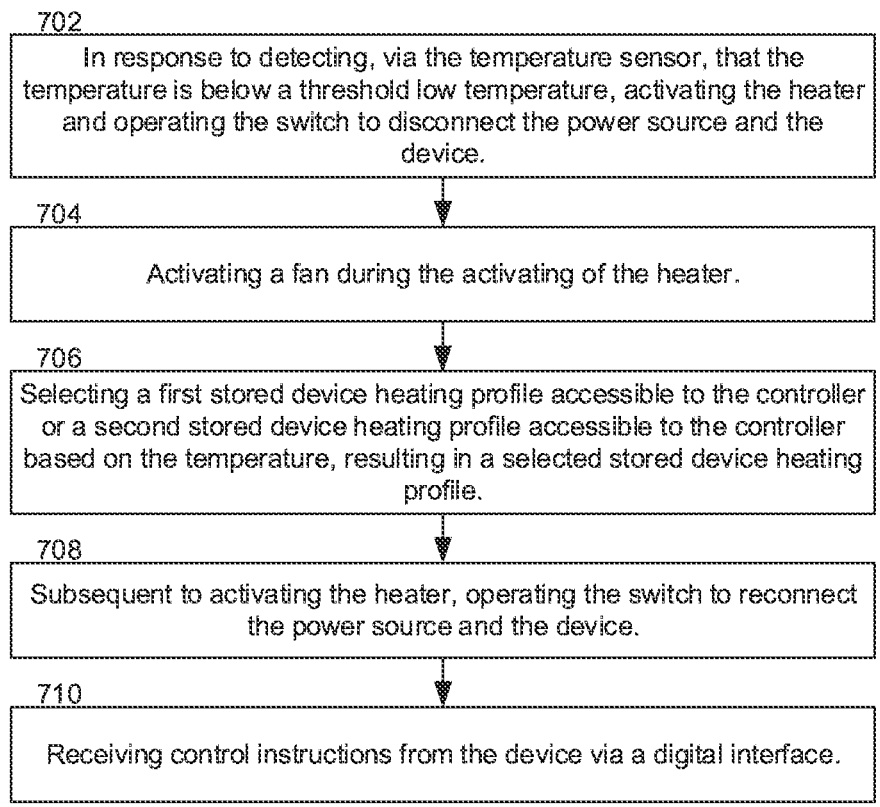
FIG. 7 is a flow diagram of an example, non-limiting computer implemented method performed by a device heater module, in accordance with one or more embodiments described herein.

FIG. 7 is a flow diagram of an example, non-limiting computer implemented method performed by a device heater module, in accordance with one or more embodiments described herein. The blocks of the illustrated method represents operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by a device heater module 200 such as illustrated in FIG. 2 and FIG. 3. For example, at least a part of the device heater module 200 can be slidably engageable with a housing cavity 111 of a device 100. The device heater module 200 can comprise a proximal end and a distal end, and a fan 320 can be positioned at the proximal end, a heater 310 can be positioned adjacent the fan 320 to allow air flow through the device heater module 200, and an air baffle 360 can be positioned at a distal end to direct air flow within a housing 110 of the device 100. The device heater module 200 can further include a memory such as memory 410 illustrated in FIG. 4, a controller 350 coupled to the memory 410, a temperature sensor 371 adapted to detect a temperature at a device 100, and a switch 300 that selectively disconnects and reconnects a power source and the device 100. The controller 350 can be adapted to perform the operations 702-710.

At 702 and 704, in response to detecting, via the temperature sensor 371, that the temperature is below a threshold low temperature, the controller 350 can be configured to activate the heater 310 and the fan 320 and operate the switch 300 to disconnect the power source and the device 100. Operation 704 is illustrated as a separate operation which can be performed separately or in conjunction with operation 702.

In some embodiments, the controller 350 can be adapted to activate the heater 310 and operate the switch 300 to disconnect the power source and the device 100 in response to detecting that the temperature is below the threshold low temperature, as noted in operation 702, as well as detecting that the device 100 is off. For example, the controller 350 can be adapted to detect via physical device interface 220 that the state of the device 100 is off. When the device 100 is on, the device 100 can manage its own temperature and operating the switch 300 to cut power to the device 100 need not be performed.

At 706, the controller 350 can be configured to select a first stored device heating profile accessible to the controller 350 or a second stored device heating profile accessible to the controller 350 based on the temperature detected at operation 702, resulting in a selected stored device heating profile. Example stored device heating profile(s) 520 are illustrated in FIG. 5. The activating of the heater 310 and the fan 320 pursuant to operation 702 and 704 can be according to the selected stored device heating profile.

At 708, subsequent to activating the heater 310, the controller 350 can be configured to operate the switch 300 to reconnect the power source and the device 100.

At 710, the controller 350 can be configured to receive control instructions from the device 100 via a digital interface. The digital interface can comprise, e.g., the interface 430 which operates via physical device interface 220. The control instructions can comprise, e.g., instructions to provide temperature information and/or instructions to operate the heater 310 and/or the fan 320.

Figure 8:
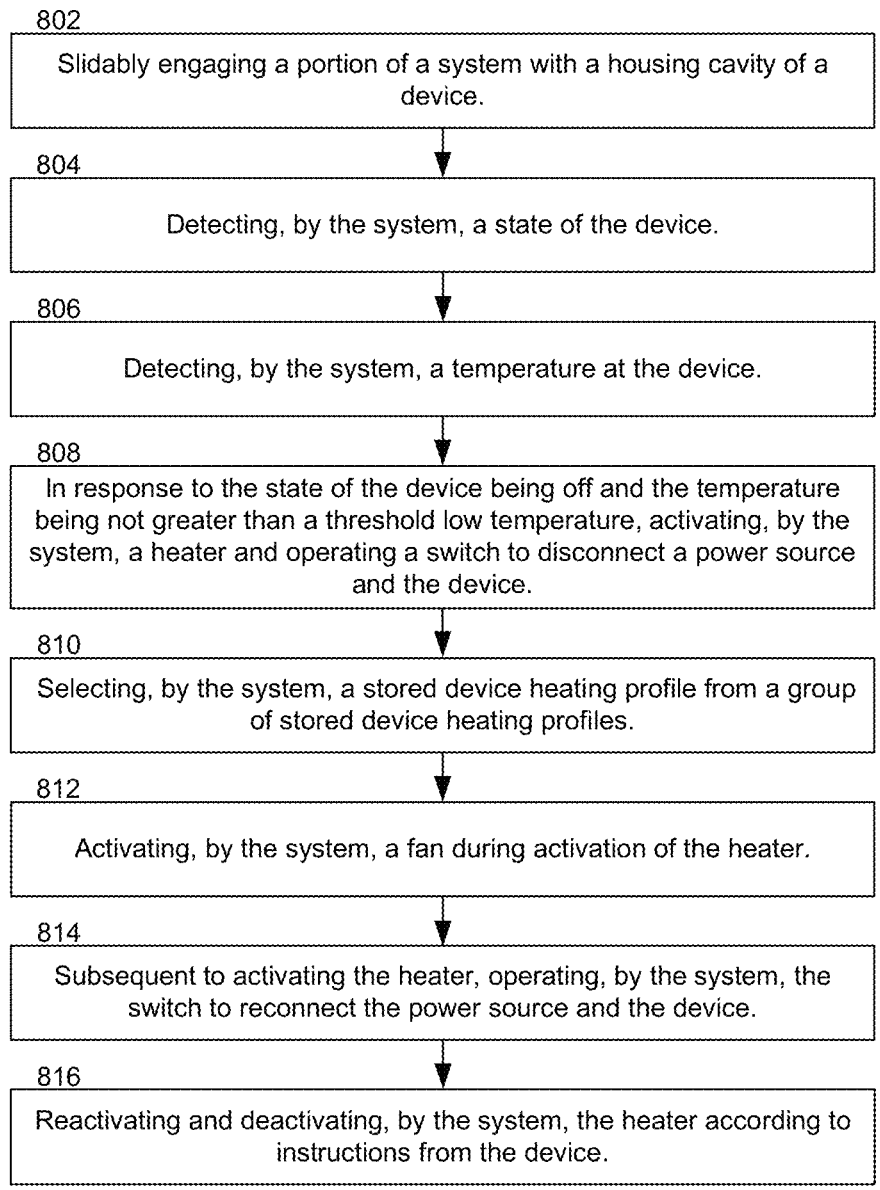
FIG. 8 is a flow diagram of another example, non-limiting computer implemented method performed by a device heater module, in accordance with one or more embodiments described herein.

FIG. 8 is a flow diagram of another example, non-limiting computer implemented method performed by a device heater module, in accordance with one or more embodiments described herein. The blocks of the illustrated method represents operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by system comprising a device heater module 200 such as illustrated in FIG. 2 and FIG. 3. For example, system comprising a device heater module 200 equipped with a controller 400 and a processor 420, such as illustrated in FIG. 4, can be used in connection with methods according to FIG. 8. The controller system can be adapted to perform the operations 802-816.

Operation 802 comprises slidably engaging a portion of a system, e.g., device heater module 200, with a housing cavity of a device such as the server 100 illustrated in FIG. 1. Once the system 200 is engaged in the device 100 and connected to external power as well as the power supply 130, the system can be ready to carry out the remainder of the operations illustrated in FIG. 8.

Operation 804 comprises detecting, by the system 200, a state of the device 100. Operation 804 can be carried out in response to a power activation at the system 200, e.g., the system 200 being connected to external power, or external power being restored after a power failure. Operation 804 can detect the state of the device 100 via the device physical interface 220. The state of the device can be, e.g., either on or off.

Operation 806 comprises detecting, by the system 200, a temperature at the device 100. For example, the system can detect temperature readings from either or both of the temperature sensors 371, 372.

Operation 808 comprises, in response to the state of the device 100 (detected pursuant to operation 804) being off and the temperature (detected pursuant to operation 806) being not greater than a threshold low temperature, activating, by the system 200, a heater 310 and operating a switch 300 to disconnect a power source (e.g., the external power illustrated in FIG. 1) and the device 100. In some embodiments, the system 200 can operate the switch 300 prior to operations 804 and 806, e.g., immediately upon activation of power at the system 200, and at operation 808, the system 200 can maintain the switch 300 in an open/disconnected state in response to the state of the device 100 being off and the temperature being not greater than a threshold low temperature. Furthermore, in some embodiments, activating the heater 310 can be performed after operation 810.

Operation 810 comprises selecting, by the system 200, a stored device heating profile from a group of stored device heating profile(s) 520. Activating the heater 310 and the fan 320 can comprise activating the heater 310 and the fan 320 for a duration according to a stored device heating profile. Furthermore, the stored device heating profile can specify fan 320 speeds and heater 310 powers to be applied.

Operation 812 comprises activating, by the system 200, a fan 320 during activation of the heater 310. The fan 320 can be activated according to a stored device heating profile or otherwise to blow air through the heater 310 and into the device 100.

Operation 814 comprises, subsequent to activating the heater 310, operating, by the system 200, the switch 300 to reconnect the power source (e.g., the external power illustrated in FIG. 1) and the device 100. Operation 814 can optionally be performed automatically upon completion of a heating cycle according to a stored device heating profile. Alternatively, operation 814 can be performed after re-checking temperature sensors 371, 372 to establish that the device 100 has reached its operating temperature range. Operation 814 can also be supplemented by storing a syswarm indicator as described herein, in order to inform the device 100 that a heating cycle was completed.

Operation 816 comprises reactivating and deactivating, by the system 200, the heater 310 according to instructions from the device 100. At operation 816, the initial heating of the device 100 is complete and the device 100 has completed its boot process. The device 100 can control the system 200 in order to operate the heater 310 and/or fan 320 as needed by the device 100. The device 100 can send a heater activation instruction to the system 200 in order to cause the system 200 to reactivate the heater 310. The device 100 can send a heater deactivation instruction to the system 200 in order to cause the system 200 to deactivate the heater 310.

Figure 9:
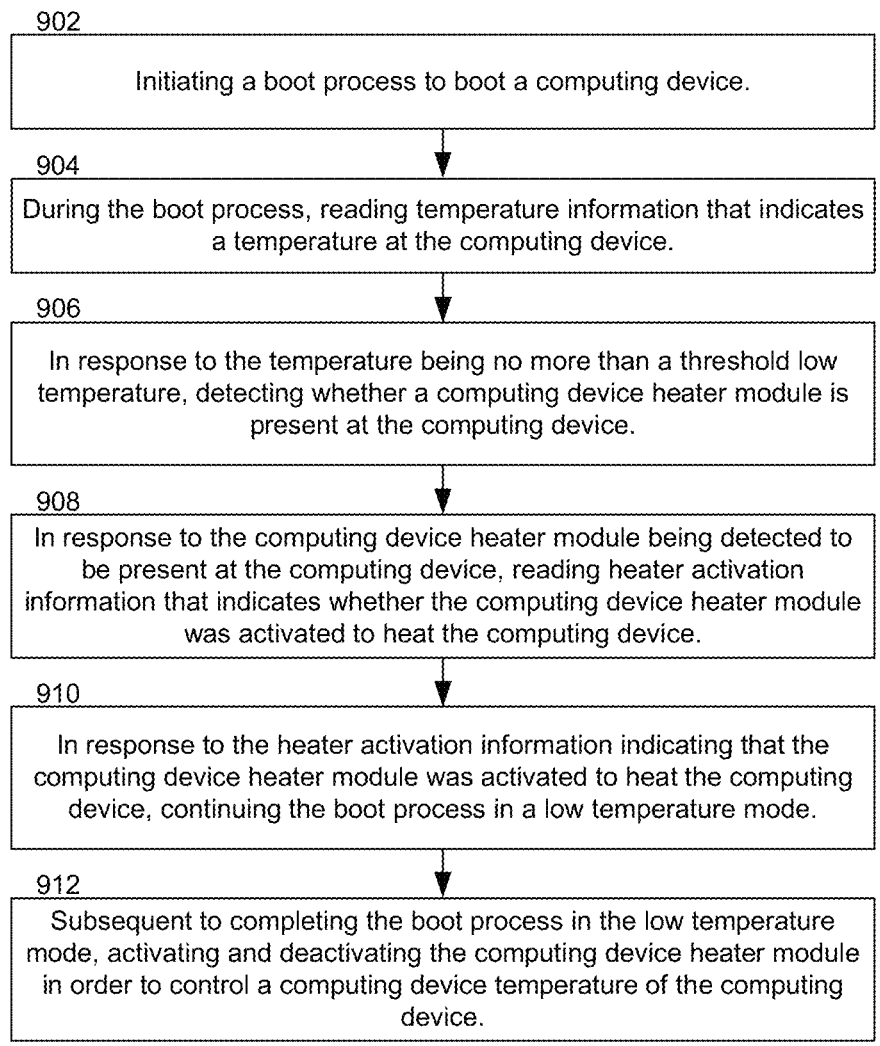
FIG. 9 is a flow diagram of an example, non-limiting computer implemented method performed by a device comprising a device heater module, in accordance with one or more embodiments described herein.

FIG. 9 is a flow diagram of an example, non-limiting computer implemented method performed by a device comprising a device heater module, in accordance with one or more embodiments described herein. The blocks of the illustrated method represents operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 9 can be performed by a computing device such as the server 100 illustrated in FIG. 1. The device 100 can be equipped with a device heater module 200 such as illustrated in FIG. 2 and FIG. 3. The device 100 can engage in a boot process 610 such as illustrated in FIG. 6, wherein the boot process 610 is performed in response to power being enabled 602 at the device 100, e.g., in response to the device heater module 200 closing the switch 300 to restore power to the device 100.

Operation 902 comprises initiating a boot process 610 to boot a computing device 100. Operation 904 comprises, during the boot process 610, reading temperature information that indicates a temperature at the computing device 100. For example, the device 100 can request a temperature reading from one of temperature sensors 371, 372, or from another temperature sensor at the device 100. In response to the temperature being no more than a threshold low temperature, the boot process 610 can continue to operation 906. When the temperature information indicates a temperature being above the threshold low temperature, the boot process 610 can instead be continued in a normal mode.

Operation 906 comprises, in response to the temperature being no more than a threshold low temperature, detecting whether a computing device heater module 200 is present at the computing device 100. In response to the computing device heater module 200 being detected to be present at the computing device 100, the boot process 610 can continue to operation 908. In response to the computing device heater module 200 being detected to be not present at the computing device 100, the boot process 610 can instead be terminated.

Operation 908 comprises, in response to the computing device heater module 200 being detected to be present at the computing device 100, reading heater activation information that indicates whether the computing device heater module 200 was activated to heat the computing device 100. For example, the computing device 100 can check for a "sys-warm" indicator from the computing device heater module 200. In response to the heater activation information indicating that the computing device heater module 200 was activated to heat the computing device 100, the boot process 610 can continue to operation 910. In response to the heater activation information indicating that the computing device heater module 200 was not activated to heat the computing device 100, the boot process 610 can instead log a heater error condition and optionally terminate the boot process 610.

Operation 910 comprises, in response to the heater activation information indicating that the computing device heater module 200 was activated to heat the computing device 100, continuing the boot process 610 in a low temperature mode. Continuing of the boot process 610 in the low temperature mode can comprise, e.g., operating a fan (either fan 320 or a different fan used by the computing device 100) at a reduced speed that is reduced relative to a fan speed used during the boot process 610 in a normal mode.

Operation 910 comprises, subsequent to completing the boot process 610 in the low temperature mode, activating and deactivating the computing device heater module 200 in order to control a computing device temperature of the computing device 100. For example, the computing device 100 can send control instructions to the computing device heater module 200 to adjust temperature as may be appropriate.

Figure 10:
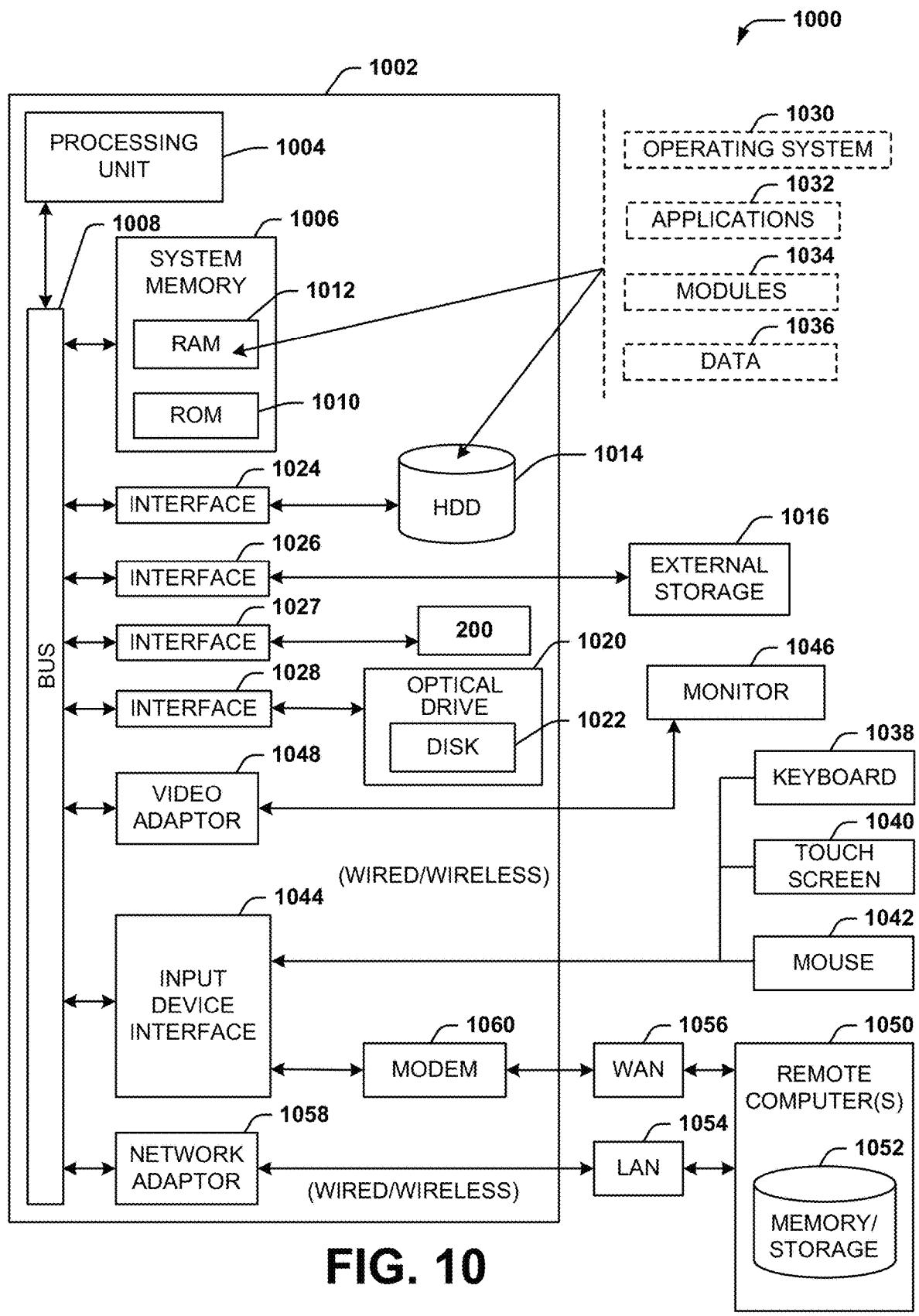
FIG. 10 illustrates a block diagram of an example computing device which can be adapted to include a device heater module, in accordance with one or more embodiments described herein.

FIG. 10 illustrates a block diagram of an example computing device which can be adapted to include a device heater module, in accordance with one or more embodiments described herein. In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems. The operating system 1030 can be adapted to perform a boot process 610 such as illustrated in FIG. 6.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc. Similarly, a device heater module 200 can connect to the processing unit 1004 through an interface 1027 that can be coupled to the system bus 1008, or can be connected by other interfaces listed above.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device heater module, comprising:
   a memory; and
   a controller coupled to the memory, a temperature sensor adapted to detect a temperature at a device, a heater adapted to heat the device, and a switch that selectively disconnects and reconnects a power source and the device, wherein the controller is adapted to perform operations, comprising:
   in response to detecting, via the temperature sensor, that the temperature is below a threshold low temperature, activating the heater and operating the switch to disconnect the power source and the device, wherein the power source is an external power supply during normal operations and a battery during a power failure scenario;
   subsequent to activating the heater, operating the switch to reconnect the external power supply and the device upon completion of a heating cycle;
   subsequent to completion of the heating cycle, allowing the device to complete a boot process; and
   accessing heater activation instructions from the device, upon completion of the boot process, to operate the heater in a continuous mode at different power values to maintain the temperature at the device within an operating temperature range of the device.

2. The device heater module of claim 1, wherein the controller is adapted to activate the heater and operate the switch to disconnect the power source and the device in response to detecting that the temperature is below the threshold low temperature and detecting that the device is off.

3. The device heater module of claim 1, wherein the operations further comprise activating a fan during the activating of the heater, and wherein the activating of the heater and the fan is according to a first stored device heating profile accessible to the controller.

4. The device heater module of claim 3, wherein the operations further comprise selecting the first stored device heating profile accessible to the controller or a second stored device heating profile accessible to the controller based on the temperature, resulting in a selected stored device heating profile, and wherein the activating of the heater and the fan is according to the selected stored device heating profile.

5. The device heater module of claim 1, wherein the operations further comprise receiving control instructions from the device via a digital interface.

6. The device heater module of claim 1, wherein a part of the device heater module is slidably engageable with a housing cavity of the device.

7. The device heater module of claim 6, wherein:
   the device heater module comprises a proximal end and a distal end;
   a fan is positioned at the proximal end;
   the heater is positioned adjacent the fan to allow air flow through the device heater module; and
   an air baffle is positioned at the distal end to direct the air flow within a housing of the device.

8. The device heater module of claim 1, wherein, subsequent to activating the heater and in response to detecting that the temperature is above the threshold low temperature, the controller operates the switch to reconnect the power source and the device.

9. A method, comprising:
   detecting, by a system comprising a processor, a state of a device;
   detecting, by the system, a temperature at the device;
   in response to the state of the device being off and the temperature being not greater than a threshold low temperature, activating, by the system, a heater and operating a switch to disconnect a power source and the device, wherein the power source is an external power supply during normal operations and a battery during a period of temporary disconnection from external power;
   subsequent to activating the heater, operating, by the system, the switch to reconnect the battery and the device upon completion of a heating cycle;
   subsequent to completion of the heating cycle, allowing the device to complete a boot process; and
   accessing heater activation instructions from the device, upon completion of the boot process, to operate the heater in a binary mode at different frequencies and time durations to maintain the temperature at the device within an operating temperature range of the device.

10. The method of claim 9, further comprising activating, by the system, a fan during activation of the heater, and wherein activating the heater and the fan comprises activating the heater and the fan for a duration according to a stored device heating profile.

11. The method of claim 10, further comprising selecting, by the system, the stored device heating profile from a group of stored device heating profiles.

12. The method of claim 9, further comprising reactivating and deactivating, by the system, the heater according to the heater activation instructions from the device.

13. The method of claim 9, further comprising slidably engaging a portion of the system with a housing cavity of the device.

14. The method of claim 9, further comprising, subsequent to activating the heater and in response to detecting that the temperature is above the threshold low temperature, operating, by the system, the switch to reconnect the power source and the device.

15. A non-transitory machine-readable medium, comprising executable instructions that, when executed by a processor, facilitate performance of operations, the operations comprising:
   initiating a boot process to boot a computing device;

during the boot process, transmitting control instructions to a computing device heater module, the control instructions comprising a temperature request to access temperature information that indicates a temperature at the computing device;

in response to the temperature being no more than a threshold low temperature, detecting via a physical device interface that the computing device heater module is present at the computing device;

in response to the computing device heater module being detected to be present at the computing device, reading heater activation information that indicates whether the computing device heater module was activated to heat the computing device, wherein the computing device checks for a signal indicative of the heater activation information stored by the computing device heater module after heating the computing device;

in response to the heater activation information indicating that the computing device heater module was activated to heat the computing device, continuing the boot process in a low temperature mode; and in response to the signal being absent, terminating the boot process, wherein absence of the signal is indicative of the computing device heater module having malfunctioned.

16. The non-transitory machine-readable medium of claim 15, wherein, in response to the temperature being above the threshold low temperature, the boot process is continued in a normal mode.

17. The non-transitory machine-readable medium of claim 15, wherein, in response to the computing device heater module not being present at the computing device, the boot process is terminated.

18. The non-transitory machine-readable medium of claim 15, wherein, in response to the heater activation information indicating that the computing device heater module was not activated, a heater error condition is logged.

19. The non-transitory machine-readable medium of claim 15, wherein the continuing of the boot process in the low temperature mode comprises operating a fan at a reduced speed that is reduced relative to a fan speed used during the boot process in a normal mode.

20. The non-transitory machine-readable medium of claim 15, wherein the operations further comprise, subsequent to completing the boot process in the low temperature mode, activating and deactivating the computing device heater module in order to control a computing device temperature of the computing device.

* * * * *